United States Patent
Lo et al.

(10) Patent No.: US 9,906,934 B2
(45) Date of Patent: Feb. 27, 2018

(54) SMART METER AND DATA ASSIGNMENT METHOD

(71) Applicant: Wistron NeWeb Corp., Hsinchu (TW)

(72) Inventors: Cheng-Kun Lo, Hsinchu (TW); Chong-Han Lai, Hsinchu (TW); Chien-Cheng Kuo, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 77 days.

(21) Appl. No.: 15/053,705

(22) Filed: Feb. 25, 2016

(65) Prior Publication Data

US 2016/0269884 A1 Sep. 15, 2016

(30) Foreign Application Priority Data

Mar. 13, 2015 (TW) .............................. 104108024 A

(51) Int. Cl.
| | |
|---|---|
| *H04M 11/00* | (2006.01) |
| *H04W 4/26* | (2009.01) |
| *H04L 29/06* | (2006.01) |
| *H04J 99/00* | (2009.01) |
| *H04B 3/50* | (2006.01) |

(52) U.S. Cl.
CPC ................ *H04W 4/26* (2013.01); *H04B 3/50* (2013.01); *H04J 15/00* (2013.01); *H04L 69/22* (2013.01)

(58) Field of Classification Search
CPC ... H04W 16/18; H04W 24/02; H04W 84/045; H04W 4/006; H04W 4/26
USPC ........................ 455/456.1, 448, 436, 10, 11.1
See application file for complete search history.

(56) References Cited

U.S. PATENT DOCUMENTS

| | | | |
|---|---|---|---|
| 5,923,269 A | 7/1999 | Shuey et al. | |
| 7,487,282 B2 | 2/2009 | Leach | |
| 2011/0092151 A1* | 4/2011 | Brisebois | H04K 3/43 455/1 |
| 2013/0083722 A1* | 4/2013 | Bhargava | H04W 48/20 370/315 |
| 2013/0143592 A1* | 6/2013 | Brisebois | H04W 24/02 455/456.1 |
| 2015/0154551 A1* | 6/2015 | Skaaksrud | H04W 12/06 705/333 |
| 2016/0099758 A1* | 4/2016 | Bell | H02J 7/0027 307/104 |

FOREIGN PATENT DOCUMENTS

| | | |
|---|---|---|
| TW | M404976 U | 6/2011 |
| TW | 201215001 A | 4/2012 |
| TW | 201345298 A | 11/2013 |
| TW | M486841 U | 9/2014 |

* cited by examiner

*Primary Examiner* — Joseph Arevalo
(74) *Attorney, Agent, or Firm* — Muncy, Geissler, Olds & Lowe, P.C.

(57) ABSTRACT

The present invention provides a smart meter including a wireless-communication chip, a wired-communication chip and a microprocessor. The microprocessor receives a data transmission request and determines whether the data type of the data transmission request is mobile data, meter information, or emergency meter information. According to the data type, the microprocessor will select either the wireless-communication chip or the wired-communication chip to transmit the data which corresponds to the data transmission request.

19 Claims, 10 Drawing Sheets

SMART METER AND DATA ASSIGNMENT METHOD

CROSS REFERENCE TO RELATED APPLICATIONS

This application claims priority of Taiwan Patent Application No. 104108024, filed on Mar. 13, 2015, the entirety of which is incorporated by reference herein.

BACKGROUND OF THE INVENTION

Field of the Invention

The present invention is related to a smart meter; in particular to a smart meter capable of transmitting data by wireless transmission or wired transmission.

Description of the Related Art

Due to the global energy shortage, many countries have implemented control mechanisms for inefficient energy use. For example, the Smart Grid has increased the efficiency of energy use. In a Smart Grid infrastructure, each country's electric companies are required to install a special device that transmits meter information in every household, business, and industrial space, lowering the cost of gathering said information compared to more traditional ways of using manpower to do so. However, the installation of these special devices increases costs for the electric companies, and furthermore the transmission of meter information must usually be performed at specific times, causing an inefficiency of use during the downtime of these devices. This translates to high hardware investment costs for the electric companies.

Also, due to the widespread use of smartphones, every cellphone is able to use 3G/4G cellular networks to download information anytime and anywhere. Most users use cellphones to download indoors, but if the user is in a blind spot marked by a weak signal, this may cause the cellphone to not be able to download information, or to download at a very slow rate. Also, if a high number of users are in the same building using the same network to download, this may also cause weak and slow signals, causing a temporary bandwidth shortage.

BRIEF SUMMARY OF THE INVENTION

A detailed description is given in the following embodiments with reference to the accompanying drawings.

An exemplary embodiment provides a smart meter including a wireless-communication chip, a wired-communication chip and a microprocessor. The wireless-communication chip transmits data to a base station and receiving data from the base station. The wired-communication chip transmits data to the base station through an Internet cable and Internet, and receives data from the base station through an Internet cable and Internet. The microprocessor is coupled to the wireless-communication chip and the wired-communication chip, receiving a data transmission request, determining whether the data requested by the data transmission request is mobile information or meter-related information, and accordingly selecting one of the wireless-communication chip or the wired-communication chip to transmit the data requested by the data transmission request, wherein the mobile information is received by the microprocessor from a first mobile device, and the meter-related information is received by the microprocessor from an appliance or a power line.

Another exemplary embodiment provides a data assignment method applied to a smart meter which communicates with a base station. The data assignment method including: receiving a data transmission request; determining whether the data requested by the data transmission request is mobile information or meter-related information according to the data transmission request, wherein the mobile information is received from a first mobile device, and the meter-related information is received from an appliance or a power line; selecting one of a wireless-communication chip or a wired-communication chip to transmit the data requested by the data transmission request according to the data requested by the data transmission request.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
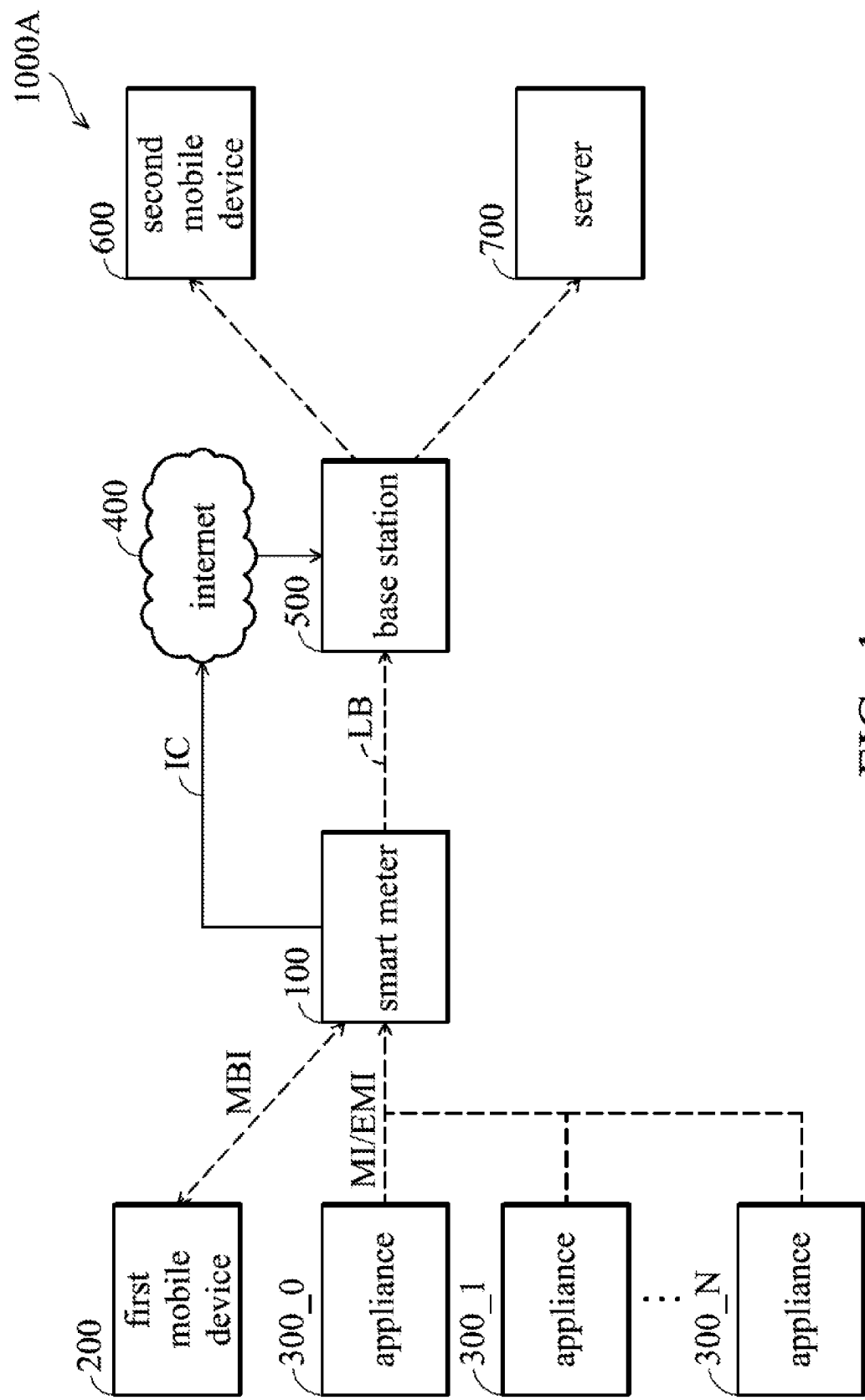
FIG. 1 is a schematic diagram illustrating an embodiment of a smart meter system of an exemplary embodiment.

FIG. 1 is a schematic diagram illustrating an embodiment of a smart meter system of an exemplary embodiment. The mart meter system 1000A includes a smart meter 100, a first mobile device 200, a plurality of appliances 300_0~300_N, Internet 400, a base station 500, a second mobile device 600 and a server 700. The smart meter 100 is arranged to receive the mobile information MBI from the first mobile device 200, and transmit the received mobile information MBI to the second mobile device 600. In one of the embodiments, the first mobile device 200 and the second mobile device 600 are capable of transmitting and receiving data by the mobile communication technology standards. For example, the first mobile device 200 and the second mobile device 600 can transmit and receive data by licensed bands of 3G or 4G. Moreover, the mobile information MBI can be multimedia information transmitted by the licensed bands of 3G or 4G. In general, the first mobile device 200 and the second mobile device 600 communicate with each other by the base station 500. When the first mobile device 200 is in the communication dead zone of the frequency band of 3G/4G or the spectrum of 3G/4G used by the first mobile device 200 is crowded, the first mobile device 200 cannot successfully connect to the base station 500. In the embodiments of the present invention, when the first mobile device 200 cannot successfully connect to the base station 500, the first mobile device 200 can connect to the smart meter 100, and connect to the base station 500 through the smart meter 100. Furthermore, the smart meter 100 is further arranged to receive the meter information MI and the emergent meter information EMI from the appliances 300_0~300_N, and transmit the meter information MI and the emergent meter information EMI to the server 700 of the power company. More specifically, in this embodiment, the appliances 300_0~300_N can transmit the meter information MI and the emergent meter information EMI to the smart meter 100 through the "Internet of Things". It should be noted that the meter information MI may include the amount of power already used by the appliances 300_0~300_N, and the emergent meter information EMI may include information about a power-off event or other abnormal power records. Next, the smart meter 100 can transmit the received meter information MI and the emergent meter information EMI to the server 700 of a power company through the base station 500. It should be noted that the smart meter 100 can connect to the base station 500 through a licensed band LB or an Internet cable IC. In another embodiment, the smart meter 100 can connect to the base station 500 through both the licensed band LB and the Internet cable IC. More specifically, the smart meter 100 can connect to the base station 500 through the licensed band LB of 3G or 4G. More specifically, the smart meter 100 can connect to the base station 500 through Internet 400 by the Internet cable IC. It should be noted that the data that is arranged to be transmitted by both the first mobile device 200 and the appliances 300_0~300_N only need one licensed band LB. Therefore, users only need to pay for one licensed band.

Figure 2:
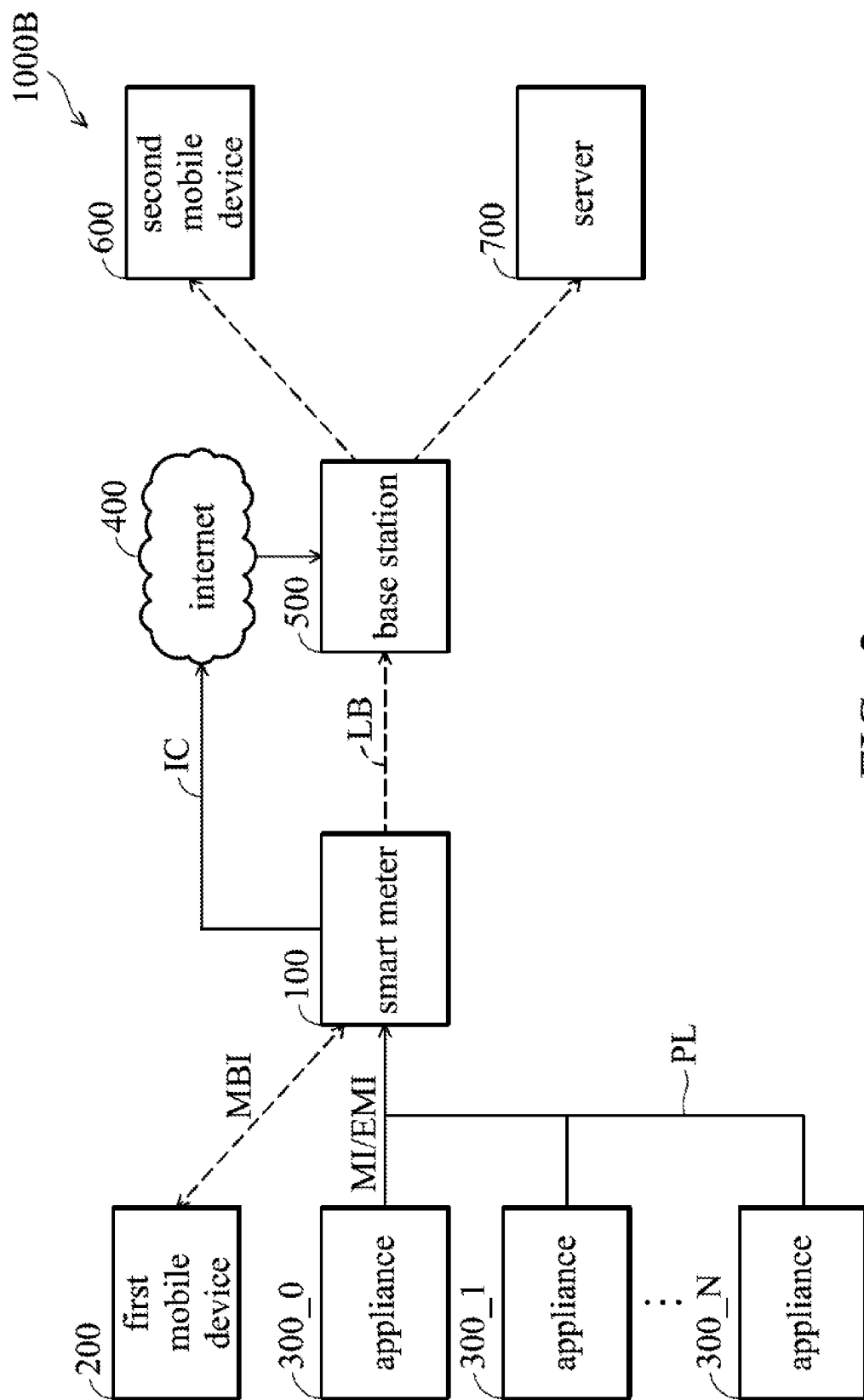
FIG. 2 is a schematic diagram illustrating another embodiment of a smart meter system of an exemplary embodiment.

FIG. 2 is a schematic diagram illustrating another embodiment of a smart meter system of an exemplary embodiment. The smart meter system 1000B includes a smart meter 100, a first mobile device 200, a plurality of appliances 300_0~300_N, Internet 400, a base station 500, a second mobile device 600 and a server 700. The smart meter system 1000B of FIG. 2 is similar to the smart meter system 1000A of FIG. 1, except that the smart meter 100 of the smart meter system 1000B of FIG. 2 is arranged to receive the meter information MI and the emergent meter information EMI through the power line PL of the appliances 300_0~300_N for transmitting the meter information MI and the emergent meter information EMI to the server 700 of the power company. More specifically, in this embodiment, each of the appliances 300_0~300_N is powered by a power line PL, and the smart meter 100 obtains the amount of power used by the appliances 300_0~300_N and other information by detecting the power line PL of the appliances 300_0~300_N. In this embodiment, the meter information MI received by the smart meter 100 can be stored in a memory device of the smart meter 100 and can be transmitted to the server 700 at a time interval in response to a transmission request.

Figure 3:
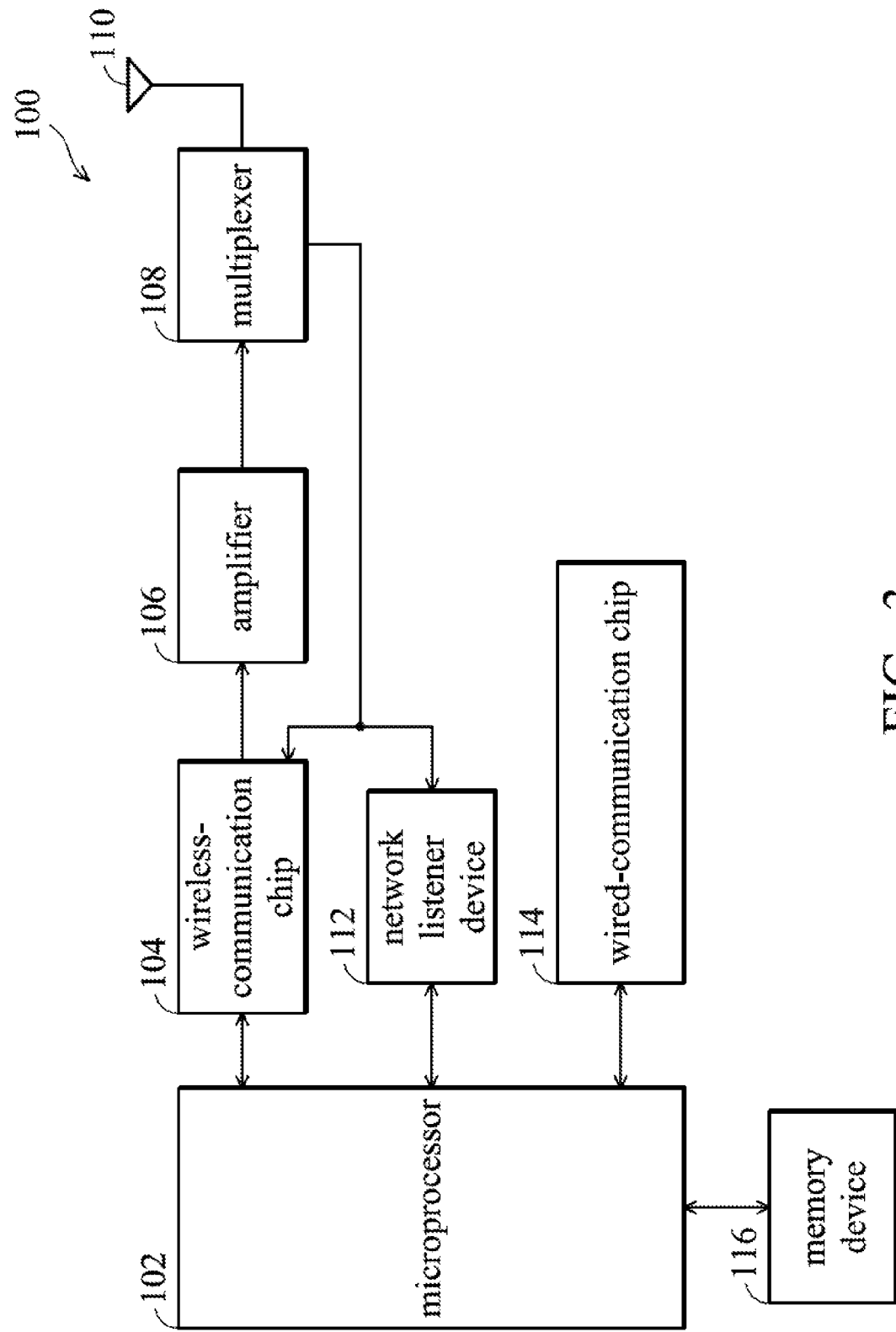
FIG. 3 is a schematic diagram illustrating an embodiment of a smart meter of an exemplary embodiment.

FIG. 3 is a schematic diagram illustrating an embodiment of a smart meter of an exemplary embodiment. The smart meter 100 includes a microprocessor 102, a wireless-communication chip 104, an amplifier 106, a multiplexer 108, an antenna 110, a network listener device 112, a wired-communication chip 114 and a memory device 116. In another embodiment, the smart meter 100 further includes another set of the wireless-communication chip 104, an amplifier 106, a multiplexer 108, an antenna 110. In this case, one set may communicate with the base station 500 and another set may communicate with the mobile device 200 or appliance 300_N. Therefore, the smart meter 100 can achieve full duplex communication.

The microprocessor 102 may include a central-processing unit (CPU). The microprocessor 102 is arranged to receive a data transmission request. It should be noted that the data transmission request can be transmitted to the microprocessor 102 from the first mobile device 200, the appliance 300_0~300_N or the power line PL. In the embodiment of FIG. 2, the data transmission request can be produced by the microprocessor 102 itself. Next, the microprocessor 102 determines whether the data requested by the data transmission request is the mobile information MBI, the meter information MI or the emergent meter information EMI according to the header of the data transmission request or a specific wire line. For example, the header of the data transmission request may include one of the identify codes of the first mobile device 200 and the appliances 300_0~300_N. Therefore, the microprocessor 102 may determine the data requested by the data transmission request is the meter-related information or the mobile information MBI according to the identify code corresponding to the first mobile device 200 or one of the appliances 300_0~300_N, wherein the meter-related information can be the meter information MI or the emergent meter information EMI. When the identify code of the data transmission request corresponds to the first mobile device 200, the microprocessor 102 determines that the data requested by the data transmission request is the mobile information MBI. When the identify code of the data transmission request corresponds to one of the appliances 300_0~300_N, the microprocessor 102 determines that the data requested by the data transmission request is the meter-related information. Moreover, the microprocessor 102 can determine whether the meter-related information is the meter information MI or the emergent meter information EEI according to the header or the operation environment. For example, in some embodiments, the header of the meter information MI is different from the header of the emergent meter information EMI. Furthermore, in some embodiments, when the microprocessor 102 detects that at least one of the appliances 300_0~300_N is abnormally powered off or undergoing an abnormal event, the microprocessor 102 defines the meter-related information as the emergent meter information EMI, otherwise, the meter-related information is defined as the meter information MI. In other embodiments, the microprocessor 102 determines whether the data requested by the data transmission request is the meter information MI, the emergent meter information EMI or the mobile information MBI according to the header of the data transmission request. Next, the microprocessor 102 selects either the wireless-communication chip 104 or the wired-communication chip 114 by a determination process to transmit the data transmission request to the selected wireless-communication chip 104 or wired-communication chip 114.

The wireless-communication chip 104 modulates signals into the RF signals to transmit the modulated signals to the base station 500 through the licensed band LB, receives RF signals from the base station 500 through the licensed band LB, and modulates the received RF signals into base band signals.

The amplifier 106 is coupled to the wireless-communication chip 104, and arranged to amplify the signals produced by the wireless-communication chip 104.

The multiplexer 108 is coupled between the amplifier 106 and the antenna 110, and arranged to enable the antenna 110 to transmit and receive data.

More specifically, the wireless-communication chip 104 modulates the data which is arranged to be transmitted to produce the RF signals corresponding to the data, and transmit the produced RF signals to the amplifier 106. The amplifier 106 is arranged to amplify the RF signals, and transmit the amplified RF signals to the multiplexer 108. The multiplexer 108 enables the antenna 110 to transmit the amplified RF signals to the base station 500. Moreover, the multiplexer 108 transmits the received RF signals to the wireless-communication chip 104. The wireless-communication chip 104 demodulates the received RF signals into digital data to transmit the digital data to the microprocessor 102. It should be noted that the multiplexer 108 is further arranged to transmit the received RF signals to the network listener device 112. In addition, the microprocessor 102 is further arranged to transmit the data received from the second mobile device 600 to the first mobile device 200. More specifically, when the smart meter 100 needs to transmit data to the first mobile device 200, the microprocessor 102 transmits the data which is requested to the wireless-communication chip 104 to be modulated, and the wireless-communication chip 104 transmits the produced RF signals to the amplifier 106. The amplifier 106 amplifies the RF signals and transmits the amplified RF signals to the multiplexer 108. The multiplexer 108 enables the antenna 110 to transmit the amplified RF signals to the first mobile device 200. It should be noted that the smart meter 100 needs to transmit data to the base station 500, such that the amplifier 106 is a high gain amplifier. Therefore, the smart meter 100 can cover a larger area than the typical small base station. Moreover, the smart meter 100 can support a plurality of frequency bands.

The network listener device 112 is coupled to the microprocessor 102 and the multiplexer 108. The network listener device 112 is arranged to determine whether the signal strength between the smart meter 100 and the base station 500 is greater than a predetermined value (dBm), and determine whether the data flow volume of a specific frequency band is greater than a predetermined data flow volume. For example, the network listener device 112 can determine whether the data flow volume of at least one frequency band supported by the first mobile device 200 is greater than a predetermined data flow volume to determine whether the frequency band of 3G/4G used by the first mobile device 200 is crowded. Furthermore, the network listener device 112 can determine whether the signal strength between the smart meter 100 and the base station 500 is greater than a predetermined value according to a reference signal received from the base station 500. More specifically, the reference signal is a predetermined bit value stored in both the base station 500 and the smart meter 100. The base station transmits the modulated reference signal to the smart meter 100. The network listener device 112 or the wireless-communication chip 104 de-modulates the received reference signal, and compares the received reference signal and the reference signal which is pre-stored in the memory device. The network listener device 112 determines the signal strength between the smart meter 100 and the base station 500 according to the difference between the received reference signal and the pre-stored reference signal. More specifically, the greater the difference between the received reference signal and the pre-stored reference signal is, the worse the signal strength is between the smart meter 100 and the base station 500.

The wired-communication chip 114 is arranged to receive packets from the base station 500 through the Internet cable IC and Internet 400, decode the received packets, and encode data into packets to transmits the encode packets to the base station 500 trough Internet 400 by the Internet cable IC. More specifically, the wired-communication chip 114 encodes the data which is arranged to be transmitted into network packets for transmitting the network packet to the base station 500 through Internet 400 by the Internet cable IC. Moreover, the wired-communication chip 114 is further arranged to decode the received network packet into digital data for transmitting the digital data to the microprocessor 102.

The memory device 116 may include a read only memory (ROM), a flash ROM and/or a random access memory (RAM) arranged to store the received data and the program codes of the microprocessor 102. For example, the microprocessor 102 stores the received meter information MI in the memory device 116, and produces a data transmission request corresponding to the meter information MI in a specific period to transmit the stored meter information MI to the server 700 of the power company through the wireless-communication chip 104 or the wired-communication chip 114. The microprocessor 102 can also receive the data transmission request from the appliances 300_0~300_N, and transmit the meter information MI or the emergent meter information EMI to the server 700 by the wireless-communication chip 104 or the wired-communication chip 114.

It should be noted that, in one of the embodiments, the network listener device 112 and the wired-communication chip 114 is an external device. Namely, the microprocessor 102, the wireless-communication chip 104, the amplifier 106, the multiplexer 108, the antenna 110 and the memory device 116 are implemented on a first motherboard, the network listener device 112 and the wired-communication chip 114 can be implemented on a second motherboard. The first motherboard has a slot arranged to be connected with the second motherboard. Namely, in some embodiments, the network listener device 112 and the wired-communication chip 114 of the smart meter 100 can selectively connected to the first motherboard.

In one of the embodiments, when the network listener device 112 determines that the signal strength between the smart meter 100 and the base station 500 is less than a predetermined value, the microprocessor 102 selects the wired-communication chip 114 to transmit the data requested by the data transmission request to the wired-communication chip 114. Namely, when the network listener device 112 determines that the signal strength between the smart meter 100 and the base station 500 is less than the predetermined value, regardless of the data requested by the data transmission request is the mobile information MBI, the meter information MI or the emergent meter information EMI, the microprocessor 102 will select the wired-communication chip 114 to transmit the mobile information MBI, the meter information MI or the emergent meter information EMI corresponding to the data transmission request to the wired-communication chip 114.

In another embodiment, when the network listener device 112 determines that the signal strength between the smart meter 100 and the base station 500 is greater than the predetermined value and the data requested by the data transmission request is the emergent meter information EMI, the microprocessor 102 is further arranged to determine whether the wireless-communication chip 104 is transmitting the mobile information MBI. While the wireless-communication chip 104 is transmitting the mobile information MBI, the microprocessor 102 reassigns the mobile information MBI which is transmitting by the wireless-communication chip 104 to the wired-communication chip 114 and assigns the emergent meter information EMI to the wireless-communication chip 104 to transmit the emergent meter information EMI to the server 700 of the power company though the licensed band LB and the base station 500. While the wireless-communication chip 104 is not transmitting the mobile information MBI, the microprocessor 102 assigns the emergent meter information EMI to the wireless-communication chip 104 to transmit the emergent meter information EMI to the server 700 through the licensed band LB and the base station 500.

In another embodiment, when the network listener device 112 determines that the signal strength between the smart meter 100 and the base station 500 is greater than the predetermined value and the data requested by the data transmission request is the meter information MI, the microprocessor 102 is further arranged to determine whether the wireless-communication chip 104 is transmitting the mobile information MBI. While the wireless-communication chip 104 is transmitting the mobile information MBI, the microprocessor 102 assigns the meter information MI to the wired-communication chip 114 to transmit the meter information MI to the server 700 of the power company through the Internet cable IC, Internet 400 and the base station 500. While the wireless-communication chip 104 is not transmitting the mobile information MBI, the microprocessor 102 assigns the meter information MI to the wireless-communication chip 104 to transmit the meter information MI to the server 700 of the power company through the licensed band LB and the base station 500.

In another embodiment, when the network listener device 112 determines that the signal strength between the smart meter 100 and the base station 500 is greater than the predetermined value and the data requested by the data transmission request is the mobile information MBI, the microprocessor 102 is further arranged to determine whether the wireless-communication chip 104 is transmitting the emergent meter information EMI. While the wireless-communication chip 104 is transmitting the emergent meter information EMI, the microprocessor 102 assigns the mobile information MBI to the wired-communication chip 114 to transmit the mobile information MBI to a second mobile device through the Internet cable IC, Internet 400 and the base station 500. While the wireless-communication chip 104 is not transmitting the emergent meter information EMI, the microprocessor 102 assigns the mobile information MBI to the wireless-communication chip 104 to transmit the mobile information MBI to the second mobile device through the licensed band LB and the base station 500.

It should be noted that, in another embodiment, when the data requested by the data transmission request is the mobile information MBI, the microprocessor 102 is further arranged to determine whether the first mobile device 200 is in a communication dead zone. For example, when the data requested by the data transmission request is the mobile information MBI, the microprocessor 102 transmits a status enquiry signal to the first mobile device 200. After the first mobile device 200 received the status enquiry signal, the first mobile device 200 detects whether the current location of the first mobile device 200 can receive data from the base station 500 and transmits a response, i.e., the detected result, to the smart meter 100. Next, the microprocessor 102 determines whether the first mobile device 200 is in the communication dead zone according to the response, i.e., the detected result. When the first mobile device 200 is in the communication dead zone, the microprocessor 102 accepts the data transmission request. When the first mobile device 200 is not in the communication dead zone, the microprocessor 102 is further arranged to enable the network listener device 112 to determine whether the data flow volume of at least one of the frequency bands supported by the first mobile device 200 is greater than the predetermined data flow volume, wherein the microprocessor 102 accepts the data transmission request when the data flow volume of the frequency band is greater than the predetermined data flow volume, and the microprocessor 102 rejects the data transmission request when the data flow volume is less than the predetermined data flow volume.

Figure 4A:
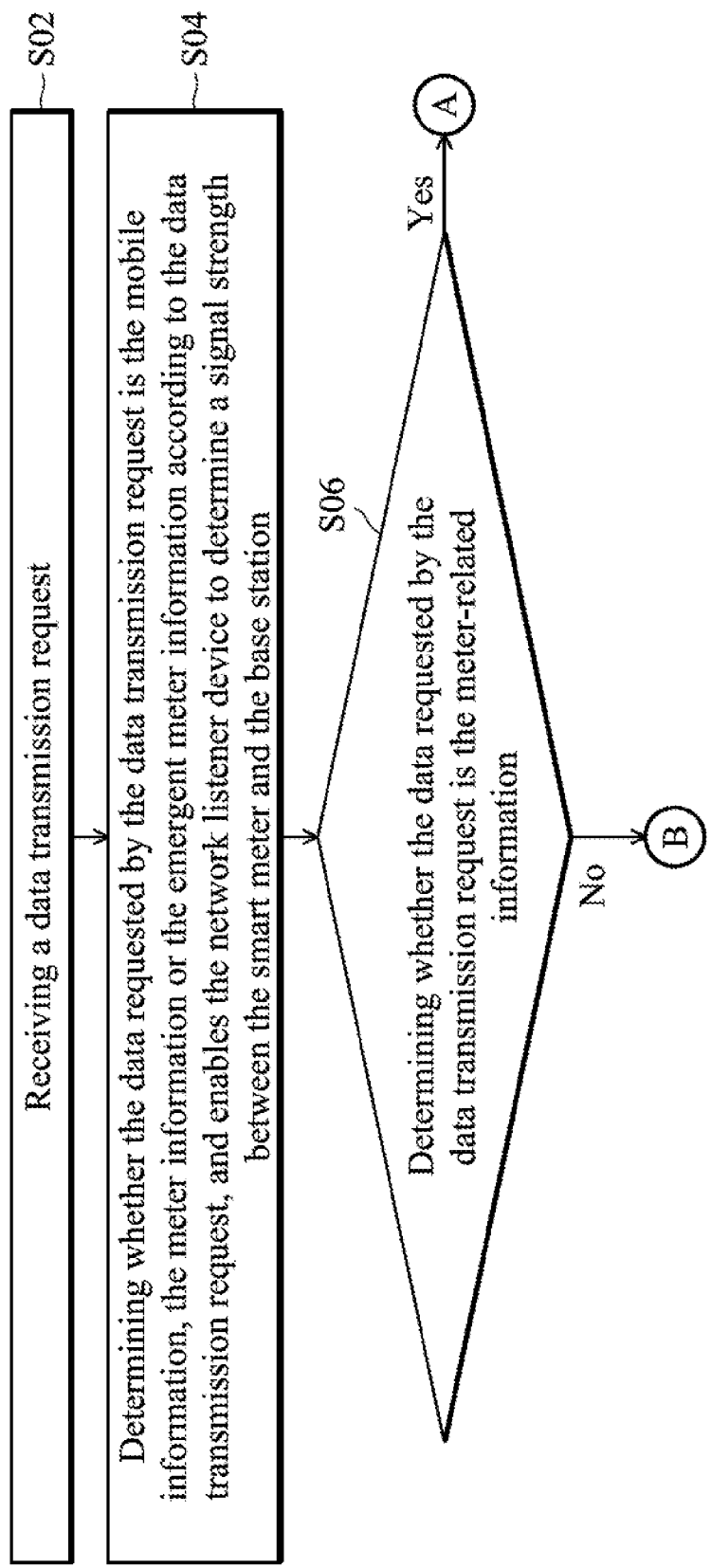
FIG. 4A-4C is a flowchart of a data assignment method according to an embodiment of the present invention.
Figure 4B:
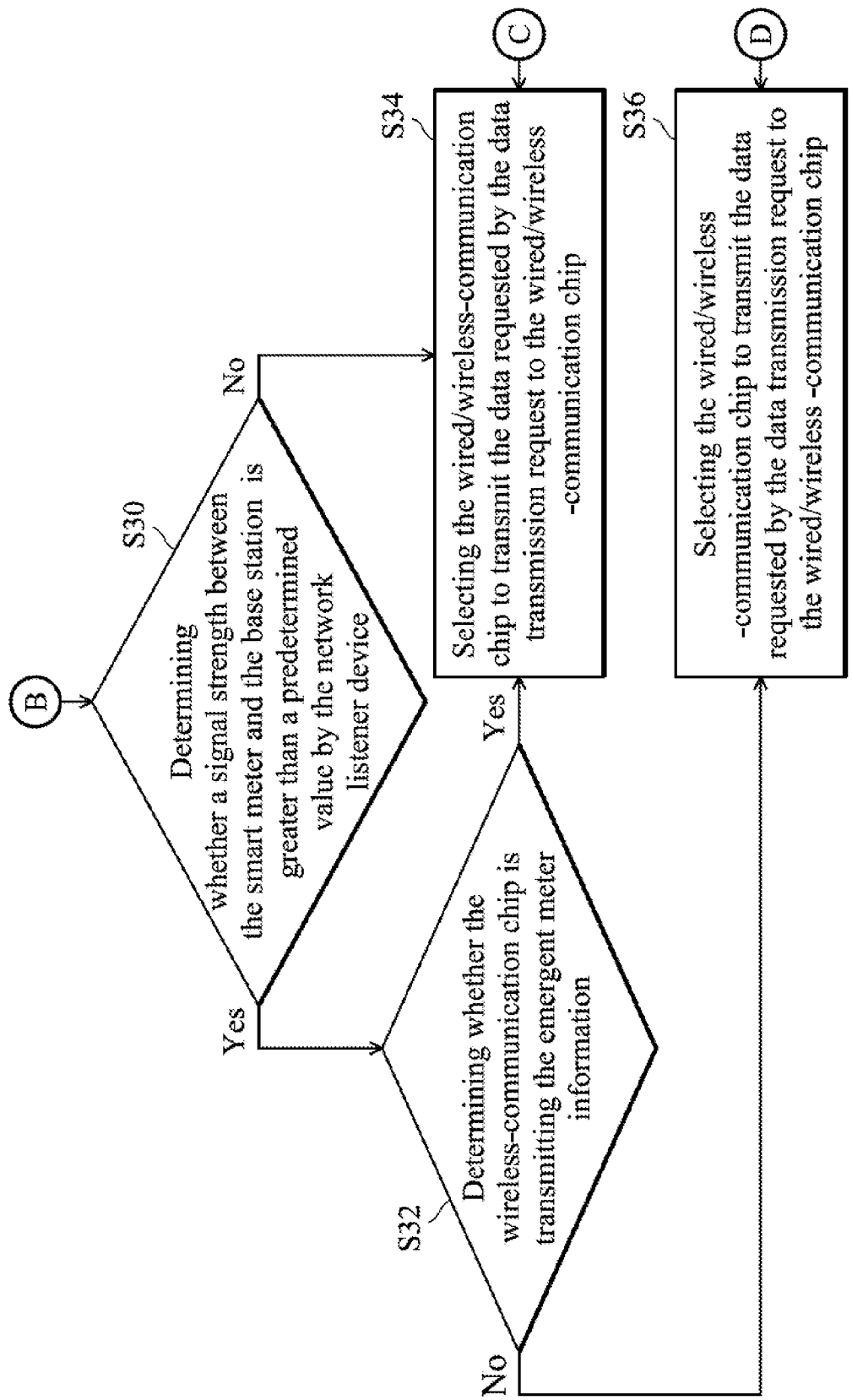
Figure 4C:
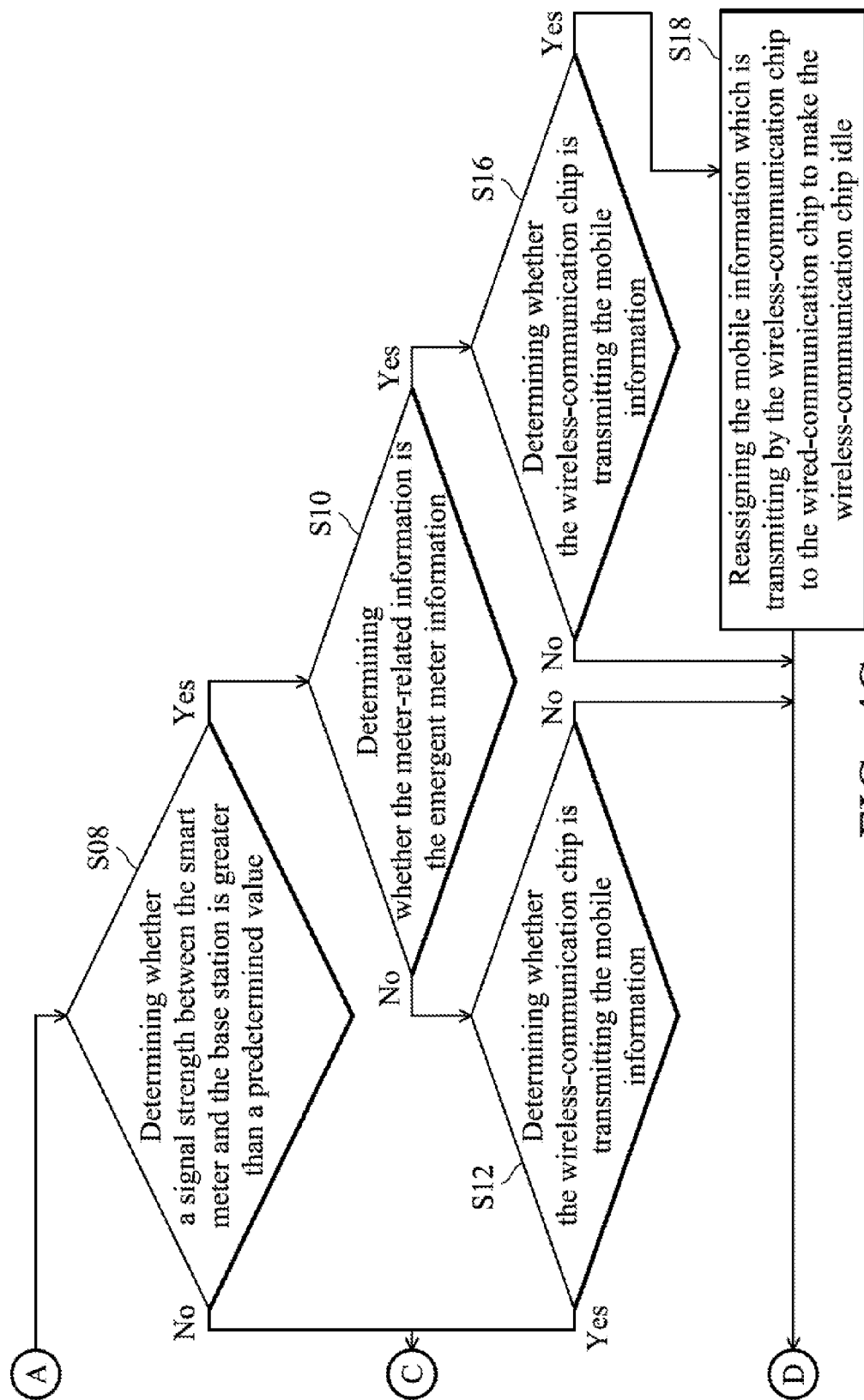
Figure 5A:
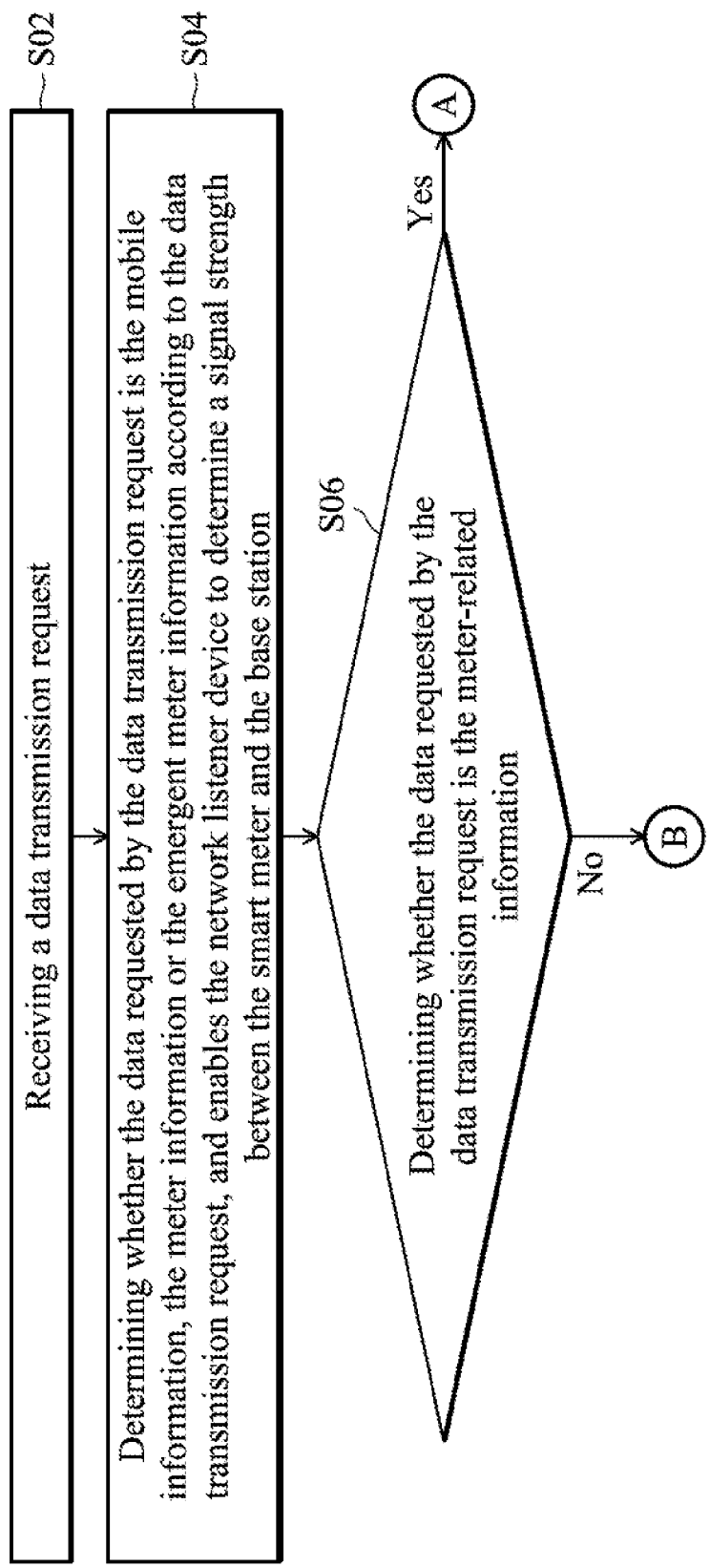
FIG. 5A-5D is a flowchart of a data assignment method according to another embodiment of the present invention.
Figure 5B:
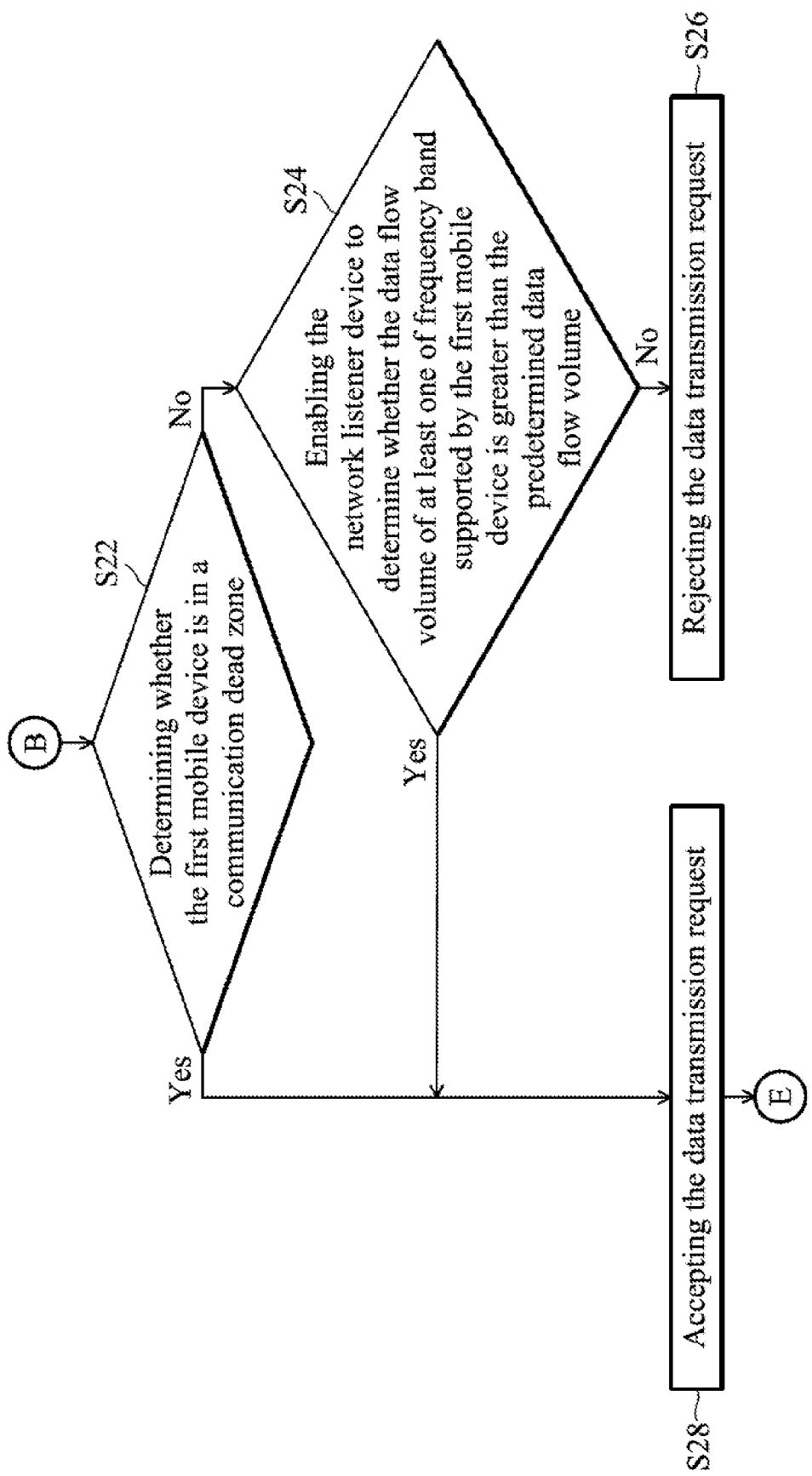
Figure 5C:
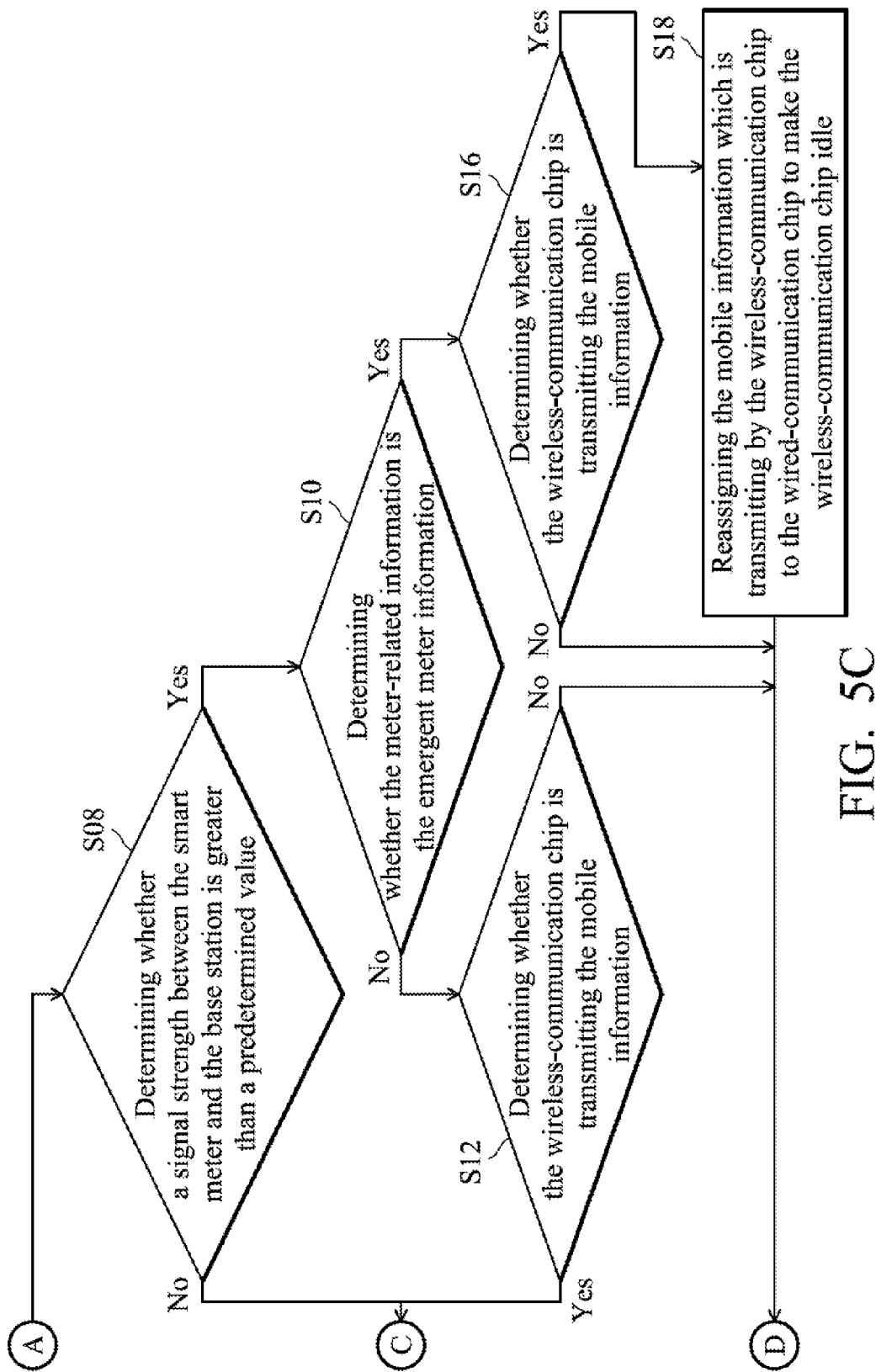
Figure 5D:
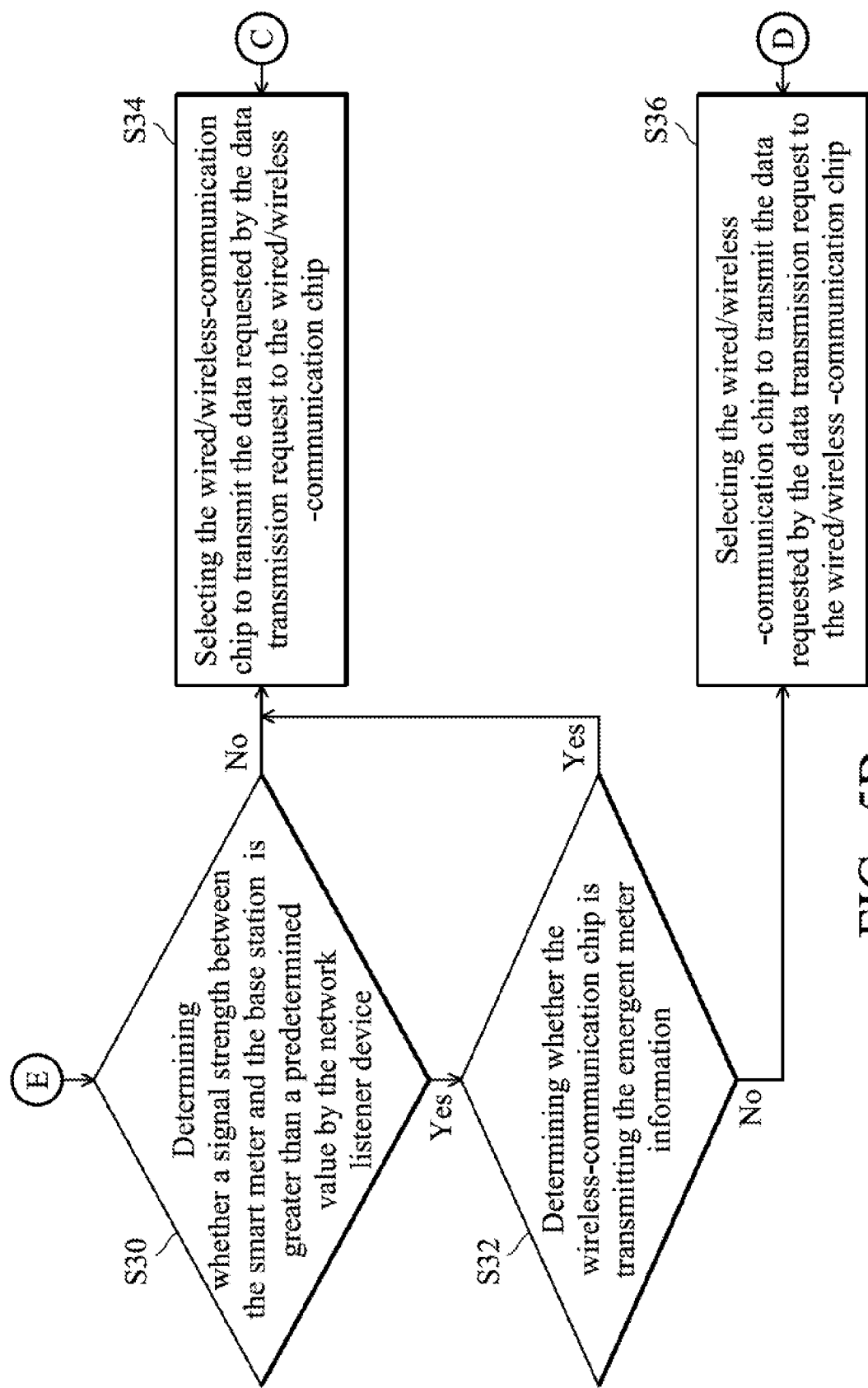

FIG. 4A-4C is a flowchart of a data assignment method according to an embodiment of the present invention. The data assignment method is applied to the smart meter 100 of FIG. 3 for selecting the wireless-communication chip 104 or the wired-communication chip 114 to transmit the data transmission request to the selected wireless-communication chip 104 or the selected wired-communication chip 114. The process starts at step S02.

In step S02, the microprocessor 102 receives a data transmission request. It should be noted that the data transmission request is transmitted to the microprocessor 102 through the first mobile device 200, the appliances 300_0~300_N or the power line PL. In the embodiment of FIG. 2, the data transmission request can be produced by the microprocessor 102 itself.

Next, in step S04, the microprocessor 102 determines whether the data requested by the data transmission request is the mobile information MBI, the meter information MI or the emergent meter information EMI according to the data transmission request, and enables the network listener device 112 to determine the signal strength between the smart meter 100 and the base station 500. More specifically, the microprocessor 102 determines whether the data requested by the data transmission request is the mobile information MBI, the meter information MI or the emergent meter information EMI according to the header of the data transmission request or a specific wire line which is arranged to transmit the data transmission request. It should be noted that the details of the step in which the microprocessor 102 determines whether the data is the mobile information MBI, the meter information MI and the emergent meter information EMI can be referred to in FIG. 3. Furthermore, the network listener device 112 may determine whether the signal strength between the smart meter 100 and the base station 500 is greater than a predetermined value according to a reference signal received from the base station 500. It should be noted that the details of the step in which the network listener device 112 determines whether the signal strength between the smart meter 100 and the base station 500 is greater than a predetermined value can be referred to in FIG. 3. More specifically, the greater the difference between the received reference signal and the pre-stored reference signal is, the worse the signal strength is between the smart meter 100 and the base station 500.

Next, in step S06, the microprocessor 102 determines whether the data requested by the data transmission request is the meter-related information, wherein the meter-related information can be the meter information MI or the emergent meter information EMI. When the data requested by the data transmission request is the meter-related information, the process goes to step S08, otherwise, the process goes to step S30.

In step S08, the microprocessor 102 determines whether the signal strength between the smart meter 100 and the base station 500 is greater than a predetermined value by the network listener device 112. More specifically, the microprocessor 102 is arranged to determine whether the signal strength between the smart meter 100 and the base station 500 is greater than the predetermined value according to the result of the signal strength determined in the step S04 by the network listener device 112. When the signal strength between the smart meter 100 and the base station 500 is greater than the predetermined value, the process goes to step S10, otherwise, the process goes to step S34.

In step S10, the microprocessor 102 determines whether the meter-related information is the emergent meter information EMI. Namely, the microprocessor 102 determines whether the meter-related information is the meter information MI or the emergent meter information EMI. When the meter-related information is the emergent meter information EMI, the process goes to step S16, otherwise, the process goes to step S12.

In step S12, the microprocessor 102 determines whether the wireless-communication chip 104 is transmitting the mobile information MBI. While the wireless-communication chip 104 is transmitting the mobile information MBI, the process goes to step S34, otherwise, the process goes to step S36.

In step S16, the microprocessor 102 determines whether the wireless-communication chip 104 is transmitting the mobile information MBI. While the wireless-communication chip 104 is transmitting the mobile information MBI, the process goes to step S18, otherwise, the process goes to step S36.

In step S18, the microprocessor 102 reassigns the mobile information MBI which is transmitting by the wireless-communication chip 104 to the wired-communication chip 114 to make the wireless-communication chip 104 idle. Next, the process goes to step S36.

In step S30, the microprocessor 102 determines whether the signal strength between the smart meter 100 and the base station 500 is greater than a predetermined value by the network listener device 112. More specifically, the microprocessor 102 is arranged to determine whether the signal strength between the smart meter 100 and the base station 500 is greater than the predetermined value according to the result of the signal strength determined in the step S04 by the network listener device 112. When the signal strength between the smart meter 100 and the base station 500 is greater than the predetermined value, the process goes to step S32, otherwise, the process goes to step S34.

In step S32, the microprocessor 102 determines whether the wireless-communication chip 104 is transmitting the emergent meter information EMI. While the wireless-communication chip 104 is transmitting the emergent meter information EMI, the process goes to step S34, otherwise, the process goes to step S36.

In step S34, the microprocessor 102 selects the wired-communication chip 114 to transmit the data requested by the data transmission request to the wired-communication chip 114. Namely, in step S34, the microprocessor 102 selects the wired-communication chip 114 to transmit the data requested by the data transmission request received in the step S02 to the wired-communication chip 114. In one of the embodiments, when the signal strength between the smart meter 100 and the base station 500 is less than the predetermined value (step S08), the microprocessor 102 selects the wired-communication chip 114 to transmit the meter-related information to the wired-communication chip 114. In another embodiment, while the wireless-communication chip 104 is transmitting the mobile information MBI (step S12), the microprocessor 102 selects the wired-communication chip 114 to transmit the meter information MI to the wired-communication chip 114. In yet another embodiment, when signal strength between the smart meter 100 and the base station 500 is less than the predetermined value (step S30), the microprocessor 102 selects the wired-communication chip 114 to transmit the mobile information MBI to the wired-communication chip 114. In a fourth embodiment, while the wireless-communication chip 104 is transmitting the emergent meter information EMI (step S32), the microprocessor 102 selects the wired-communication chip 114 to transmit the mobile information MBI to the wired-communication chip 114. The process ends at step S34. In another embodiment of step S34, the microprocessor 102 selects the wireless-communication chip 104 to transmit the data requested by the data transmission request to the wireless-communication chip 104.

In step S36, the microprocessor 102 selects the wireless-communication chip 104 to transmit the data requested by the data transmission request to the wireless-communication chip 104. Namely, the microprocessor 102 selects the wireless-communication chip 104 to transmit the data requested by the data transmission request received in step S02 to the wireless-communication chip 104. In one of the embodiments, while the wireless-communication chip 104 is not transmitting the mobile information MBI (step S12), the microprocessor 102 selects the wireless-communication chip 104 to transmit the meter information MI to the wireless-communication chip 104. In another embodiment, while the wireless-communication chip 104 is transmitting the mobile information MBI, the microprocessor 102 reassigns the mobile information MBI to the wired-communication chip 114 (step S18) to transmit the emergent meter information EMI to the wireless-communication chip 104. In yet another embodiment, while the wireless-communication chip 104 is not transmitting the mobile information MBI (step S16), the microprocessor 102 selects the wireless-communication chip 104 to transmit the emergent meter information EMI to the wireless-communication chip 104. In a fourth another embodiment, while the wireless-communication chip 104 is not transmitting the emergent meter information EMI (step S32), the microprocessor 102 selects the wireless-communication chip 104 to transmit the mobile information MBI to the wireless-communication chip 104. The process ends at step S36. It should be noted that the wireless-communication chip 104 can transmit the emergent meter information EMI to the base station 500 by wireless transmission immediately. If the emergent meter information EMI is transmitted by the wired-communication chip 114 in wired transmission, the emergent meter information EMI might be delayed or lost due to Internet traffic. Therefore, in this embodiment, the emergent meter information EMI that has high priority is assigned to the wireless-communication chip 104. In another embodiment of step S36, the microprocessor 102 selects the wired-communication chip 114 to transmit the data requested by the data transmission request to the wired-communication chip 114.

FIG. 5A-5D is a flowchart of a data assignment method according to another embodiment of the present invention. The data assignment method is applied to the smart meter 100 of FIG. 3 for selecting either the wireless-communication chip 104 or the wired-communication chip 114 to transmit the data requested by the data transmission request to the selected communication chip. The process starts at step S02. The data assignment method of FIG. 5 is similar to the data assignment method of FIG. 4, except that the data assignment method of FIG. 5 further includes steps S22, S24, S26 and S28. The details of steps S02~S18 and S30~S36 can be referred to in FIG. 4.

In step S22, when the data requested by the data transmission request is not the meter-related information, the microprocessor 102 determines whether the first mobile device 200 is in a communication dead zone. For example, when the data requested by the data transmission request is the mobile information MBI, the microprocessor 102 transmits a status enquiry signal to the first mobile device 200. After the first mobile device 200 received the status enquiry signal, the first mobile device 200 detects whether the current location of the first mobile device 200 can receive data from the base station 500 and transmits a response, i.e., the detected result, to the smart meter 100. Next, the microprocessor 102 determines whether the first mobile device 200 is in the communication dead zone according to the response, i.e., the detected result. When the first mobile device 200 is in the communication dead zone, the process goes to step S28, otherwise, the process goes to step S24.

In step S24, the microprocessor 102 enables the network listener device 112 to determine whether the data flow volume of at least one of the frequency bands supported by the first mobile device 200 is greater than the predetermined data flow volume. When the data flow volume of at least one of the frequency bands supported by the first mobile device 200 is greater than the predetermined data flow volume, the process goes to step S28, otherwise, the process goes to step S26.

In step S26, the microprocessor 102 rejects the data transmission request received in step S02. The process ends at step S26. Therefore, the mobile information MBI requested by data transmission request will be transmitted by the first mobile device 200 itself.

In step S28, the microprocessor 102 accepts the data transmission request received in step S02. Next, the process goes to step S30.

It should be noted that, in other embodiments of the present invention, when the wireless-communication chip 104 and the wired-communication chip 114 need to transmit two different types of information at the same time, the microprocessor 102 can determine the sequence according to the priorities of the information. In one of the embodiments, the priority of the emergent meter information EMI is 1, the priority of the meter information MI is 3, and the priority of the mobile information MBI is 2.

As described above, the communication module of the smart meter 100 of the present invention performs the function of a micro base station, such that telecom carriers may put the production cost of the micro base station onto the smart meters. The mobile device 200 will have better signal strength with the aid of the smart meter. The power company may rent the micro base station to the telecom carriers to increase the usage rate of the communication module of the smart meter 100, and the data of the meter and the mobile device can share one licensed band that costs money. If the radio spectrum is unstable or unable to transmit, the data of the smart meter 100 may be transmitted by the wired Internet and the data required to be transmitted in real-time also can be transmitted by the 3G or 4G mobile telecommunications technology.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A smart meter, comprising:
   a wireless-communication chip transmitting data to a base station and receiving data from the base station;
   a wired-communication chip transmitting data to the base station through an Internet cable and Internet, and receiving data from the base station through an Internet cable and Internet; and
   a microprocessor coupled to the wireless-communication chip and the wired-communication chip, receiving a data transmission request, determining whether the data requested by the data transmission request is mobile information or meter-related information, and accordingly selecting one of the wireless-communication chip or the wired-communication chip to transmit the data requested by the data transmission request, wherein the mobile information is received by the microprocessor from a first mobile device, and the meter-related information is received by the microprocessor from an appliance or a power line;
   wherein when signal strength between the smart meter and the base station is greater than a predetermined value and the wireless-communication chip is not transmitting the mobile information, the microprocessor assigns the meter-related information to the wireless-communication chip to transmit the meter-related information to the server of the power company through a licensed band and the base station, and
   wherein the microprocessor determines whether the wireless-communication chip is transmitting the mobile information when the signal strength is greater than a predetermined value and the data requested by the data transmission request is the emergent meter information, wherein while the wireless-communication chip is transmitting the mobile information, the microprocessor re-assigns the mobile information to the wired-communication chip and assigns the emergent meter information to the wireless-communication chip to transmit the emergent meter information to a server of a power company through the licensed band and the base station, wherein while the wireless-communication chip is not transmitting the mobile information, the microprocessor assigns the emergent meter information to the wireless-communication chip to transmit the emergent meter information to the server of the power company through the licensed band and the base station.

2. The smart meter as claimed in claim 1, wherein the meter-related information is meter information or emergent meter information, and the microprocessor determines whether the data requested by the data transmission request is the mobile information, the meter information or the emergent meter information according to a header of the data transmission request.

3. The smart meter as claimed in claim 2, further comprising:
   an amplifier coupled to the wireless-communication chip, and amplifying signals produced by the wireless-communication chip;
   an antenna;
   a multiplexer coupled between the amplifier and the antenna, enabling the antenna to transmit data and receive data; and
   a network listener device coupled to the microprocessor and the multiplexer, and determining whether the signal strength between the smart meter and the base station is greater than the predetermined value.

4. The smart meter as claimed in claim 3, wherein when the signal strength is less than the predetermined value, the microprocessor selects the wired-communication chip to transmit the data requested by the data transmission request.

5. The smart meter as claimed in claim 4, wherein the microprocessor determines whether the wireless-communication chip is transmitting the mobile information when the signal strength is greater than the predetermined value and the data requested by the data transmission request is the meter information, wherein the microprocessor assigns the meter information to the wired-communication chip to transmit the meter information to the server of the power company through the Internet cable, the Internet and the base station while the wireless-communication chip is transmitting the mobile information, wherein the microprocessor assigns the meter information to the wireless-communication chip to transmit the meter information to the server of the power company through the licensed band and the base station while the wireless-communication chip is not transmitting the mobile information.

6. The smart meter as claimed in claim 4, wherein the microprocessor determines whether the wireless-communication chip is transmitting the emergent meter information when the signal strength is greater than the predetermined value and the data requested by the data transmission request is the mobile information, wherein the microprocessor assigns the mobile information to the wired-communication chip to transmit the mobile information to a second mobile device through the Internet cable, the Internet and the base station while the wireless-communication chip is transmitting the emergent meter information, wherein the microprocessor assigns the mobile information to the wireless-communication chip to transmit the mobile information to the second mobile device through the licensed band and the base station while the wireless-communication chip is not transmitting the emergent meter information.

7. The smart meter as claimed in claim 1, wherein the microprocessor determines whether the first mobile device is in a communication dead zone when the data requested by the data transmission request is the mobile information, wherein the microprocessor accepts the data transmission request when the first mobile device is in the communication dead zone.

8. The smart meter as claimed in claim 7, wherein the microprocessor transmits a status enquiry signal to the first mobile device and determines whether the first mobile device is in the communication dead zone according to a response of the status enquiry signal.

9. The smart meter as claimed in claim 7, wherein the network listener device further determines whether a data flow volume of at least one frequency band supported by the first mobile device is greater than a predetermined data flow volume when the first mobile device is in the communication dead zone, wherein the microprocessor accepts the data transmission request when the data flow volume of the frequency band is greater than the predetermined data flow volume, and the microprocessor rejects the data transmission request when the data flow volume is less than the predetermined data flow volume.

10. A data assignment method, applied to a smart meter which communicates with a base station, comprising:
receiving a data transmission request;
determining whether the data requested by the data transmission request is mobile information or meter-related information according to the data transmission request, wherein the mobile information is received from a first mobile device, and the meter-related information is received from an appliance or a power line;
selecting one of a wireless-communication chip or a wired-communication chip to transmit the data requested by the data transmission request according to the data requested by the data transmission request;
wherein when signal strength between the smart meter and the base station is greater than a predetermined value and the wireless-communication chip is not transmitting the mobile information, assigning the meter-related information to the wireless-communication chip to transmit the meter-related information to the server of the power company through a licensed band and the base station, and
wherein the method further comprises:
determining whether the wireless-communication chip is transmitting the mobile information when the signal strength is greater than a predetermined value and the data requested by the data transmission request is the emergent meter information, wherein while the wireless-communication chip is transmitting the mobile information,
re-assigning the mobile information to the wired-communication chip and assigning the emergent meter information to the wireless-communication chip to transmit the emergent meter information to a server of a power company through the licensed band and the base station, wherein while the wireless-communication chip is not transmitting the mobile information, and
assigning the emergent meter information to the wireless-communication chip to transmit the emergent meter information to the server of the power company through the licensed band and the base station.

11. The data assignment method as claimed in claim 10, wherein the meter-related information is meter information or emergent meter information, the step of determining whether the data requested by the data transmission request is the mobile information or the meter-related information further comprises determining whether the data requested by the data transmission request is the mobile information, the meter information or the emergent meter information according to a header of the data transmission request.

12. The data assignment method as claimed in claim 10, wherein the step of selecting one of the wireless-communication chip or the wired-communication chip further comprises:
determining whether the data requested by the data transmission request is the meter-related information, wherein the meter-related information is the meter information or the emergent meter information;
determining whether the signal strength between the smart meter and the base station is greater than the predetermined value by a network listener device when the data requested by the data transmission request is the meter-related information;
determining whether the meter-related information is the meter information or the emergent meter information when the signal strength between the smart meter and the base station is greater than the predetermined value; and
selecting the wired-communication chip to transmit the meter-related information when the signal strength between the smart meter and the base station is less than the predetermined value.

13. The data assignment method as claimed in claim 12, wherein the step of selecting one of the wireless-communication chip or the wired-communication chip further comprises:
determines whether the wireless-communication chip is transmitting the mobile information when the meter-related information is the meter information;

selecting the wired-communication chip to transmit the meter information when the wireless-communication chip is transmitting the mobile information, wherein the meter information is transmitted to the server of the power company through an Internet cable, Internet and the base station; and selecting the wireless-communication chip to transmit the meter information when the wireless-communication chip is not transmitting the mobile information, wherein the meter information is transmitted to the server of the power company through the licensed band and the base station.

14. The data assignment method as claimed in claim 12, wherein the step of selecting one of the wireless-communication chip or the wired-communication chip further comprises:

determining whether the wireless-communication chip is transmitting the mobile information when the meter-related information is the emergent meter information;

re-assigning the mobile information to the wired-communication chip while the wireless-communication chip is transmitting the mobile information, and selecting the wireless-communication chip to transmit the emergent meter information while the wireless-communication chip is transmitting the mobile information, wherein the emergent meter information is transmitted to the server of the power company through the licensed band and the base station; and selecting the wireless-communication chip to transmit the emergent meter information while the wireless-communication chip is not transmitting the mobile information, wherein the emergent meter information is transmitted to the server of the power company through the licensed band and the base station.

15. The data assignment method as claimed in claim 12, wherein the step of selecting one of the wireless-communication chip or the wired-communication chip further comprises:

determining whether signal strength between the smart meter and the base station is greater than the predetermined value by a network listener device when the data requested by the data transmission request is not the meter-related information;

determining whether the wireless-communication chip is transmitting the emergent meter information when the signal strength between the smart meter and the base station is greater than the predetermined value; and selecting the wired-communication chip to transmit the mobile information when the signal strength between the smart meter and the base station is less than the predetermined value.

16. The data assignment method as claimed in claim 15, wherein the step of selecting one of the wireless-communication chip or the wired-communication chip further comprises:

selecting the wired-communication chip to transmit the mobile information while the wireless-communication chip is transmitting the emergent meter information, wherein the mobile information is transmitted to a second mobile device through an Internet cable, Internet and the base station; and selecting the wireless-communication chip to transmit the mobile information while the wireless-communication chip is not transmitting the emergent meter information, wherein the mobile information is transmitted to the second mobile device through a licensed band and the base station.

17. The data assignment method as claimed in claim 10, wherein the step of selecting one of the wireless-communication chip or the wired-communication chip further comprises:

determining whether the first mobile device is in a communication dead zone when the data requested by the data transmission request is not the meter-related information; and accepting the data transmission request when the first mobile device is in the communication dead zone.

18. The data assignment method as claimed in claim 17, wherein the step of determining whether the first mobile device is in the communication dead zone further comprises:

transmitting a status enquiry signal to the first mobile device; and determining whether the first mobile device is in the communication dead zone according to a response of the status enquiry signal of the first mobile device.

19. The data assignment method as claimed in claim 17, wherein the step of selecting one of the wireless-communication chip or the wired-communication chip further comprises:

determining whether a data flow volume of at least one frequency band supported by the first mobile device is greater than a predetermined data flow volume when the first mobile device is not in the communication dead zone;

accepting the data transmission request when the data flow volume of the frequency band is greater than the predetermined data flow volume; and rejecting the data transmission request when the data flow volume of the frequency band is less than the predetermined data flow volume.

* * * * *